United States Patent
Abe (10) Patent No.: US 8,734,990 B2
(45) Date of Patent: May 27, 2014

(54) POSITIVE ELECTRODE OF LITHIUM SECONDARY BATTERY AND METHOD FOR PRODUCING THE SAME

(75) Inventor: Takeshi Abe, Okazaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 504 days.

(21) Appl. No.: 12/934,316

(22) PCT Filed: Mar. 23, 2009

(86) PCT No.: PCT/JP2009/055597
§ 371 (c)(1),
(2), (4) Date: Sep. 24, 2010

(87) PCT Pub. No.: WO2009/122933
PCT Pub. Date: Oct. 8, 2009

(65) Prior Publication Data
US 2011/0027649 A1  Feb. 3, 2011

(30) Foreign Application Priority Data
Apr. 2, 2008  (JP) .................. 2008-095797

(51) Int. Cl.
*H01M 4/62* (2006.01)
*H01M 4/66* (2006.01)
*H01M 10/058* (2010.01)

(52) U.S. Cl.
USPC ........... 429/217; 429/232; 429/245; 29/623.5

(58) Field of Classification Search
None
See application file for complete search history.

(56) References Cited

U.S. PATENT DOCUMENTS

2007/0122714 A1* 5/2007 Suzuki et al. ................. 429/232
2009/0220678 A1   9/2009 Kono et al.

FOREIGN PATENT DOCUMENTS

| JP | 11-149916   | * | 6/1999  |
|----|-------------|---|---------|
| JP | 2001-23613  |   | 1/2001  |
| JP | 2002-50398  |   | 2/2002  |
| JP | 2002-110249 |   | 4/2002  |
| JP | 2003-157836 |   | 5/2003  |
| JP | 3501113     |   | 12/2003 |
| JP | 2006-4739   |   | 1/2006  |
| JP | 2006-134777 |   | 5/2006  |

OTHER PUBLICATIONS

Machine translation of JP 11-149916, Jun. 1999.*
Machine translation of JP 2006-004739, Jan. 2006.*
International Search Report in International Application No. PCT/JP2009/055597; Mailing Date: Apr. 28, 2009.

* cited by examiner

*Primary Examiner* — Jonathan Crepeau
(74) *Attorney, Agent, or Firm* — Finnegan, Henderson, Farabow, Garrett & Dunner, LLP (57) ABSTRACT

The present invention provides a positive electrode (30) for lithium secondary batteries, including: a barrier layer, having a conductive material and at least one type of water-insoluble polymer that is soluble in organic solvents but insoluble in water, as a binder; and a positive electrode active material layer, being a positive electrode active material layer (35) stacked on the barrier layer, and having a positive electrode active material and at least one type of aqueous polymer that is insoluble in organic solvents but soluble or dispersible in water, as a binder. A content of the water-insoluble polymer in the barrier layer is 55 to 85 mass % with respect to 100 mass % of a total amount of the conductive material plus the water-insoluble polymer.

6 Claims, 2 Drawing Sheets

POSITIVE ELECTRODE OF LITHIUM SECONDARY BATTERY AND METHOD FOR PRODUCING THE SAME

TECHNICAL FIELD

The present invention relates to a positive electrode used as a constituent element of a battery, and to a method for manufacturing the positive electrode.

The present application claims priority to Japanese Patent Application No. 2008-095797, filed on Apr. 2, 2008, the entire contents of which are hereby incorporated herein by reference.

BACKGROUND ART

Various types of lightweight, high-power batteries are widely used as power sources in vehicle on-board power sources or power sources in personal computers, cell phones and other mobile electronic products, and further applications of such batteries are expected to be ongoingly developed. Lithium secondary batteries are one form of such batteries. A typical lithium ion battery comprises a positive electrode and a negative electrode respectively provided with a layer containing a positive electrode active material and a layer containing a negative electrode active material (active material layers) formed on positive and negative collectors, the positive electrode active material and the negative electrode active material being capable of storing and releasing lithium ions. The lithium ion battery comprises also a non-aqueous electrolyte solution having lithium ion conductivity.

A representative method for forming the active material layers on the collectors of the positive electrode and negative electrodes involves, for instance, applying a composition having a positive or negative active material as a main component (composition for forming an active material layer) and that is prepared, in the form of a paste or slurry, by dispersing the active material in an aqueous solvent or non-aqueous solvent, followed by drying and/or heating to remove the solvent in the active material layer. Besides the solvent active material as a main component, one, two or more types of other materials (typically, conductive materials, binders and the like) are also added to prepare the composition for forming an active material layer.

When the paste or slurry-like composition for forming an active material layer (hereafter "paste for forming an active material layer") is prepared using a solvent in the form of an organic solvent (non-aqueous solvent), the binder used is a polymer soluble in organic solvents, such as polyvinylidene fluoride (PVDF) or the like. By contrast, when the paste for forming an active material layer is prepared using an aqueous solvent as the solvent, there is preferably used a water-dispersible polymer such as polytetrafluoroethylene (PTFE). Herein, a paste for forming an active material layer wherein the paste uses an aqueous solvent (hereafter "aqueous paste for forming an active material layer") is advantageous in terms of reducing the overall environmental burden, since such a paste gives rise to little industrial waste, for instance waste water, thanks to not using organic solvents. Equipment and treatment costs associated with that waste can be avoided as a result.

In the preparation of an aqueous paste for forming a positive electrode active material layer, however, there occur exchange reactions between protons and lithium ions at the surface of the positive electrode active material, on account of the high reactivity between the positive electrode active material and water, depending on the nature of the positive electrode active material that is contained in the paste (for instance, a lithium-nickel complex oxide having a composition represented by formula $LiNiO_2$). The pH of the aqueous paste for forming a positive electrode active material layer may rise as a result. When such a high-pH aqueous paste is applied onto the positive electrode collector (for instance, Al foil), compounds exhibiting high electric resistivity (for instance, oxides and hydroxides) form readily on the collector surface, which may result in a greater initial internal resistance of the battery.

Such being the case, Patent document 1 discloses a method that involves forming a beforehand a barrier layer (conductive layer) on the collector surface by applying a paste-like composition comprising a binder, a conductive material and an organic solvent, onto a positive electrode collector surface, and forming then a positive electrode active material layer on the surface of the barrier layer using an aqueous paste for forming a positive electrode active material layer. The method disclosed in Patent document 1 prevents the formation of the above-mentioned resistive compounds through the formation of the barrier layers between the collectors and the active material layers. Patent document 2 is another instance of prior art.

Patent document 1: Japanese Patent Application Laid-open No. 2006-4739

Patent document 2: Japanese Patent No. 3501113

A barrier layer (conductive layer) such as the on disclosed in Patent document 1 requires water resistance, to prevent the generation of high-resistivity compounds on the collector surface, by suppressing direct contact between the collector and the aqueous paste for forming a positive electrode active material layer, and requires also conductivity, so that electric resistance does not rise excessively between the collector and the positive electrode active material layer. To realize good conductivity, for instance, the barrier layer is preferably as thin as possible. However, a thin conventional barrier layer (for instance, the conductive layer disclosed in Patent document 1) tends to have insufficient water resistance.

DISCLOSURE OF THE INVENTION

Therefore, the present invention was achieved with a view to solving the above conventional problem relating to the formation of an active material layer in a positive electrode that is used as a constituent element of batteries. An object of the present invention is to provide a positive electrode that comprises a collector on the surface whereof there is formed a barrier layer (conductive layer) that realizes high water resistance and high conductivity, in cases where a positive electrode active material layer is formed on a positive electrode collector surface using an aqueous paste for forming a positive electrode active material layer. Another object of the present invention is to provide a method for suitably manufacturing a positive electrode in which such a barrier layer is formed. Yet another object of the present invention is to provide a lithium secondary battery that has good battery characteristics (for instance, battery capacity and charge-discharge cycle characteristics) through the use of such a positive electrode.

To attain the above goal, the present invention provides a positive electrode that is used in lithium secondary batteries (typically, lithium ion batteries).

The positive electrode provided by the present invention includes: a positive electrode collector; a barrier layer, formed on a positive electrode collector, and having a conductive material, and at least one type of water-insoluble polymer that is soluble in organic solvents but insoluble in water, as a binder; and a positive electrode active material layer, being a positive electrode active material layer stacked on the barrier layer, and having a positive electrode active material, and at least one type of aqueous polymer that is insoluble in organic solvents but soluble or dispersible in water, as a binder. The positive electrode of the present invention disclosed herein is characterized in that a content of the water-insoluble polymer in the barrier layer is 55 to 85 mass % with respect to 100 mass % of a total amount of the conductive material plus the water-insoluble polymer.

In a positive electrode having the above configuration, the ratio of water-insoluble polymer (binder) in the composition for forming a barrier layer is relatively higher (55 to 85 mass %, more preferably 60 to 80 mass %) than the content proportion of conductive material in the composition for forming a barrier layer. A barrier layer having excellent binding to the collector surface is formed thus thanks to this relative abundance of binder in the composition for forming a barrier layer. The water resistance of the barrier layer can be increased as a result, and formation of resistive compounds can be prevented more reliably. The increased water resistance allows enhancing the swelling resistance of the binder towards the non-aqueous electrolyte solution.

Therefore, a positive electrode having the above features allows adequately preventing the formation of the above-described high-resistivity compounds, and preventing increases in the initial internal resistance of the battery. Accordingly, a high-quality, high-performance lithium secondary battery can be manufactured by using the positive electrode disclosed herein.

In a preferred embodiment of the positive electrode disclosed herein, a thickness of the barrier layer that makes up the positive electrode is no greater than 3 μm. A positive electrode having thus a thin barrier layer formed on the collector surface boasts enhanced conductivity (conductive paths) between the collector and the active material layer stacked on the barrier layer surface. A positive electrode having excellent conductivity and higher performance can be provided as a result.

Preferably, a thickness of the positive electrode active material layer is formed to be greater than the thickness of the barrier layer. For instance, the positive electrode active material layer is formed to a thickness about 10 to 160 times the thickness of the barrier layer.

In another aspect for achieving the above objects, the present invention provides a lithium secondary battery (typically, a lithium ion battery) that is built using any of the positive electrodes disclosed herein. A lithium secondary battery using such a positive electrode comprises a high-binding barrier layer stacked on the surface of the collector that makes up the positive electrode. As a result, high-resistivity compounds are prevented from forming on the collector surface, while good conductive paths are formed by the barrier layer, during formation of the positive electrode active material layer using the aqueous paste. As a result, the present invention allows building a battery that retains good battery characteristics (for instance, battery capacity and charge-discharge cycle characteristics).

In another aspect for achieving the above objects, the present invention provides a method for manufacturing a positive electrode of a lithium secondary battery (typically, a lithium ion battery).

The manufacturing method comprises the steps of: (1) preparing a composition for forming a barrier layer, having a conductive material, an organic solvent and at least one type of water-insoluble polymer that is soluble in organic solvents but insoluble in water, as a binder; (2) applying the prepared composition onto a positive electrode collector surface, to form a barrier layer on the positive electrode collector; and (3) applying a composition for forming an active material layer, comprising a positive electrode active material, an aqueous solvent and at least one type of aqueous polymer that is insoluble in organic solvents but soluble or dispersible in water, as a binder, onto a surface of the formed barrier layer, to form a positive electrode active material layer on the barrier layer. The composition for forming a barrier layer is prepared in such a manner that a content of the water-insoluble polymer in the composition is set to 55 to 85 mass % with respect to 100 mass % of a total amount of the conductive material plus the water-insoluble polymer.

In the above manufacturing method, the ratio of water-insoluble polymer (binder) in the composition for forming a barrier layer is relatively higher (55 to 85 mass %, more preferably 60 to 80 mass %) than the content proportion of conductive material in the composition for forming a barrier layer, and the composition for forming a barrier layer is applied to the collector surface prior to the application of the positive electrode composition for forming an active material layer (i.e. the aqueous paste for forming a positive electrode active material layer). A barrier layer having excellent binding can be formed thereby on the collector surface, which prevents, as a result, formation of high-resistivity compounds (for instance, oxides or hydroxides of the metal (for instance, Al) that makes up the positive electrode collector) on the positive electrode collector surface, even after application of the aqueous paste for forming a positive electrode active material layer.

Therefore, the manufacturing method disclosed herein allows suitably manufacturing a positive electrode for lithium secondary batteries that affords good battery performance (for instance, battery capacity and charge-discharge cycle characteristics), by using an aqueous paste for forming a positive electrode active material layer.

In a preferred embodiment of the manufacturing method disclosed herein, the method includes a treatment of heating the collector up to 140 to 150° C. after application of the composition for forming a barrier layer onto the positive electrode collector surface.

In such a manufacturing method, the organic solvent in the composition for forming a barrier layer is removed quickly in the above heating treatment, and the crystallinity of the water-insoluble polymer (i.e. binder) in the composition for forming a barrier layer is increased. Such a high-crystallinity polymer does not swell readily when coming into contact with the non-aqueous electrolyte solution during construction of the battery. As a result, the barrier layer is prevented from peeling or coming off, and also the resistance of the barrier layer is prevented from increasing on account of binder swelling.

The above manufacturing method, therefore, allows suitably manufacturing a positive electrode that is appropriate for manufacturing lithium secondary batteries having excellent durability and in which increases in initial resistance are suppressed.

Preferably, in particular, the manufacturing method includes, after stacking of the composition for forming an active material layer (i.e. the aqueous paste for forming a positive electrode active material layer) onto the barrier layer surface, drying the stacked composition at a temperature not higher than 150° C. In such a manufacturing method, the aqueous solvent (typically water) of the aqueous paste can be easily dried off. Also, there can be preserved an adequate degree of crystallinity of the binder of the barrier layer, the crystallinity whereof is increased through heating up to 140 to 150° C., as described above. As a result there can be suitably manufactured a positive electrode of a battery having good conductivity (conductive paths) between the collector and the active material.

BEST MODE FOR CARRYING OUT THE INVENTION

Preferred embodiments of the present invention are explained below. Any features other than the features specifically set forth in the present description and which may be necessary for carrying out the present invention can be regarded as design matter for a person skilled in the art on the basis of known techniques in the technical field in question. The present invention can be carried out on the basis of the technical features disclosed in the present description and common technical knowledge in the technical field in question.

The positive electrode for lithium secondary batteries disclosed herein is obtained, as described above, by forming a barrier layer on a collector surface, and stacking next a positive electrode active material layer. The composition and shape of the collector, as a constituent element of the positive electrode, is not particularly limited. A conductive member comprising a metal having good conductivity can be used as the collector. In particular, however, a collector made of aluminum (Al) is preferably used as the positive electrode collector for lithium secondary batteries.

The shape of the collector varies depending on the shape of the positive electrode and the battery, and hence is not particularly limited. The collector may be embodied in various forms, for instance a rod, a plate, a sheet or a foil. As a preferred embodiment of the lithium secondary battery constructed using any of the positive electrodes disclosed herein, the battery comprises for instance a wound-type electrode body. In such an embodiment there is used a collector comprising a foil-like metal such as aluminum foil. In a battery provided with a wound-type electrode body, the latter is a manufactured by stacking a positive electrode sheet that is obtained by stacking a positive electrode active material layer and a barrier layer on the surface of a foil-like collector for positive electrodes comprising Al or the like, and a negative electrode sheet obtained by adhering an appropriate negative electrode active material onto the surface of a foil-like collector for negative electrodes comprising a metal (for instance, copper), carbon or the like, with separators interposed between the electrode sheets, and by winding then the resulting stack. A porous polyolefin (polyethylene, polypropylene or the like) sheet can be used for instance as the separator. The wound-type electrode body is stuffed in an appropriate container together with an electrolyte solution (typically, a non-aqueous electrolyte solution such as the below-described one), to construct thereby a lithium secondary battery. The manufacture of collectors of various shapes may be accomplished in accordance with any known conventional method in the field of secondary battery manufacture, and does not constitute thus a characterizing feature of the present invention.

The conductive material used in the positive electrode for lithium secondary batteries disclosed herein is not limited to a specific conductive material, and may be a conductive material used in various conventional secondary batteries, for instance, a carbon material such as carbon powder or carbon fibers. Examples of carbon powder that can be used include, for instance, carbon black (for instance, acetylene black, furnace black, ketchen black), graphite powder or the like. The foregoing may be used singly or in combinations of two or more.

The binder comprised in the barrier layer, being a binder used in the positive electrode for lithium secondary batteries disclosed herein, is preferably a water-insoluble polymer that is soluble in organic solvents but insoluble in water. Examples of such a polymer include, for instance, polyvinylidene fluoride (PVDF), polyvinylidene chloride (PVDC), polyethylene oxide (PEO), polypropylene oxide (PPO), a polyethylene oxide-propylene oxide copolymer (PEO-PPO) or the like, preferably PVDF, PVDC or the like.

The binder comprised in the positive electrode active material layer, being a binder used in the positive electrode for lithium secondary batteries disclosed herein, is preferably an aqueous polymer that is insoluble in organic solvents but soluble or dispersible in water and that is employed conventionally, as a binder, in the preparation of an aqueous paste for forming a positive electrode active material layer using an aqueous solvent (typically water). Examples of hydrophilic aqueous polymers that dissolve in water, include, for instance, cellulose derivatives such as carboxymethylcellulose (CMC), methylcellulose (MC), cellulose acetate phthalate (CAP), hydroxypropylmethylcellulose (HPMC) or hydroxypropylmethylcellulose phthalate (HPMCP), preferably CMC. Examples of polymers that disperse in water include, for instance, fluororesins such as polytetrafluoroethylene (PTFE), tetrafluoroethylene-perfluoroalkylvinyl ether copolymers (PFA), tetrafluoroethylene-hexafluoropropylene copolymers (FEP), ethylene-tetrafluoroethylene copolymers (ETFE), vinyl acetate copolymers, and rubbers such as styrene-butadiene block copolymers (SBR), acrylic acid-modified SBR resins (SBR latexes), gum arabic or the like, preferably fluororesins such as PTFE or the like.

A method for manufacturing the positive electrode for lithium secondary batteries of the present invention is explained next. In the method disclosed herein, a composition for forming a barrier layer is applied onto the collector surface (onto one or both faces of the collector, depending on the shape and use), and then a positive electrode active material layer is stacked on the formed barrier layer.

The composition for forming a barrier layer is a composition prepared by mixing an organic solvent, a conductive material and a binder in the form of at least one type of water-insoluble polymer that is soluble in organic solvents but insoluble in water. Typically, the composition is prepared in the form of a paste (or slurry). The paste (or slurry)-like composition for forming a barrier layer (hereafter, also "paste for forming a barrier layer") can be prepared by adding an appropriate conductive material (for instance, a carbon powder) and a binder (for instance, PVDF), in appropriate mass ratios, to an appropriate organic solvent, with mixing of the whole.

As the non-aqueous solvent for preparing the paste for forming a barrier layer there can be appropriately used an organic solvent that is employed in the preparation of conventional solvent-based pastes for forming active material layers. Examples thereof include, for instance, N-methyl-2-pyrrolidone (NMP), methyl ethyl ketone, toluene or the like, preferably NMP.

In order to form a barrier layer having excellent binding, the conductive material and the water-insoluble polymer are preferably blended in such a manner that the content of the water-insoluble polymer ranges from 55 to 85 mass % (more preferably, from 60 to 80 mass %) with respect to 100 mass % of the total amount of conductive material plus water-insoluble polymer (binder). If the content of water-insoluble polymer (binder) is significantly lower than 55 mass % (preferably 60 mass %), it becomes difficult to prevent the above-described high-resistivity compounds from forming on the collector surface, as a result of which the initial internal resistance of the battery may increase, which is undesirable. When the content of water-insoluble polymer (binder) is significantly greater than 85 mass % (preferably 80 mass %), the content of conductive material (carbon material or the like) decreases, with a corresponding drop in conductivity (i.e. fewer conductive paths), which is undesirable.

The blending ratio between the organic solvent and the elements that make up the barrier layer is not particularly limited. For instance, the composition is preferably prepared in such a manner that the organic solvent (for instance NMP) is substantially 80 to 95 mass % of the entire composition for forming a barrier layer (typically, conductive material+water-insoluble polymer+organic solvent).

A paste for forming a barrier layer prepared as described above is then applied onto the collector surface, to form a barrier layer on the collector. The paste for forming a barrier layer can be typically formed on the collector surface by being coated in the form of a layer, using an appropriate coating device (coater). In order to secure enough conductive paths in the barrier layer, coating is preferably performed to a thickness no greater than 3 μm (typically, 0.5 μm to 3 μm, for instance from about 1 μm to 3 μm, in particular from about 1 μm to 2 μm). For instance, the paste for forming a barrier layer can be applied, using an appropriate coating device (coater), to a thickness no greater than 3 μm (typically, 0.5 μm to 3 μm, for instance from about 1 μm to 3 μm, in particular from about 1 μm to 2 μm) on the surface of a foil-like collector (for instance, Al foil) having a predetermined thickness.

After coating, the collector is preferably heated at a highest temperature ranging from 140 to 150° C. in an appropriate dryer. This heating treatment has the effect of allowing removing the organic solvent in the composition for forming a barrier layer and of increasing the crystallinity of the water-insoluble polymer comprised in the composition for forming a barrier layer (coating material) to an appropriate degree. A barrier layer of predetermined thickness can be formed thus on the collector surface.

After formation of the barrier layer as described above, the positive electrode active material layer is stacked onto the barrier layer. The composition for forming an active material layer used to realize the present invention is a composition prepared by mixing a positive electrode active material, an aqueous solvent (typically water), and a binder in the form of at least one type of aqueous polymer that is insoluble in organic solvents but soluble or dispersible in water. Typically, the composition is prepared in the form of a paste (or slurry). The aqueous paste for forming a positive electrode active material layer can be prepared by, for instance, adding at least one type of an appropriate active material for positive electrodes (for instance, a lithium-transition metal complex oxide such as $LiNiO_2$, $LiCoO_2$, $LiMn_2O_4$ or the like), typically in powder form, and at least one type of binder (CMC, PTFE or the like), to water, in appropriate mass proportions, with mixing of the whole.

The solvent used for preparing the aqueous paste for forming a positive electrode active material layer is preferably water or a mixed solvent having water as a main component. Examples of solvents other than water that make up the above mixed solvent include, for instance, one, two or more types of appropriately selected organic solvents that can be mixed homogeneously with water (lower alcohols, lower ketones or the like). For instance, there is preferably used an aqueous solvent wherein about 80 mass % or more thereof is water (more preferably, about 90 mass % or more, yet more preferably about 95 mass % or more). In a particularly preferred example, the aqueous solvent consists essentially of water (and is, for instance, water).

Preferably, a conductive material is further incorporated in order to secure sufficient conductive paths between the barrier layer, the collector and the positive electrode active material in the active material layer. Preferably, the materials are blended, for instance, in such a manner that the content of active material is 80 to 95 mass %, and the content of binder is 1 to 15 mass % with respect to 100 mass % of the total content of active material plus binder. Alternatively, the materials are preferably blended in such a manner that the content of active material is 85 to 99 mass %, the content of conductive material is 2 to 15 mass % and the content of binder is 1 to 15 mass % with respect to 100 mass % of the total content of active material plus conductive material plus binder. The blending ratio of the aqueous solvent and the elements that make up the active material layer is not particularly limited. For instance, the composition is preferably prepared in such a manner that the aqueous solvent takes up about 40 to 60 mass % of the total composition for forming an active material layer (typically, active material+conductive material+aqueous polymer+aqueous solvent).

The active material layer can be stacked/formed by applying the aqueous paste for forming a positive electrode active material layer prepared as described above onto the surface of the barrier layer. As in the case of the above-described barrier layer, the paste for forming an active material layer is applied onto the barrier layer surface of the collector, using an appropriate coating device (coater), to form a layer having a predetermined thickness (about 30 μm to 80 μm). The coating thickness is not particularly limited, and may vary appropriately depending on the shape and use of the positive electrode and the battery. The active material layer is preferably formed in such a manner that the thickness ratio between the final barrier layer and the positive electrode active material layer (barrier layer:positive electrode active material layer) is about 1:10 to 1:160.

The aqueous paste for forming a positive electrode active material layer is coated onto the barrier layer surface to a desired thickness, and then the paste for forming an active material layer is dried at a temperature not higher than 150° C. (for instance, 120 to 150° C., preferably, in particular, from 140 to 150° C.) using an appropriate dryer. The aqueous solvent (typically water) of the aqueous paste can be dried easily in such a process. The degree of crystallinity of binder of the barrier layer, the crystallinity whereof is accelerated through heating up to 140 to 150° C. as described above, can be kept thereby at an appropriate level.

The ratio between the thickness of the positive electrode active material layer and the barrier layer in the finally obtained state may vary depending on, for instance, ambient conditions (temperature, humidity and so forth), and on pressing conditions, in a case where pressing is performed after application of the barrier layer and the active material layer coated onto the collector. The ratio of the thickness of the barrier layer and the positive electrode active material layer can be easily adjusted so as to lie within the above appropriate range by suitably setting the thickness of the barrier layer and the positive electrode active material layer in accordance with, for instance, ambient conditions such as temperature and humidity, and press conditions. In particular, for instance, the ratio between the thickness of the barrier layer and the positive electrode active material layer after pressing lies preferably within the above range.

The present invention allows manufacturing a lithium secondary battery (typically, lithium ion battery) provided with a positive electrode obtained in accordance with the method disclosed herein. In another aspect, therefore, the present invention provides a method for manufacturing a lithium secondary battery characterized by producing or preparing the positive electrode disclosed herein.

Except for the manufacture (or preparation) and subsequent use of the above-described positive electrode, the means for producing the lithium secondary battery (for instance, lithium ion battery) may conform to conventional lithium secondary battery manufacturing methods, which require no processes that need a particular explanation.

Figure 1:
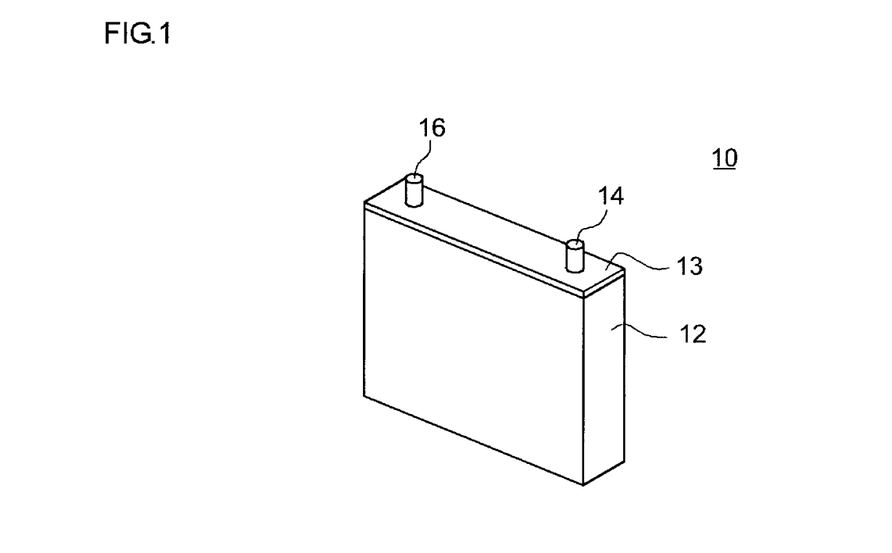
FIG. 1 is a perspective-view diagram illustrating schematically a lithium secondary battery according to an embodiment.

An example of a lithium secondary battery suitably constructed using the positive electrode provided by the present invention will be explained next with reference to FIG. 1 and FIG. 2.

A lithium ion battery 10 illustrated in the figures comprises a housing (outer container) 12 made of metal (resin or a laminated film are also appropriate). An elongated sheet-like positive electrode 30, a separator 50A, a negative electrode 40 and a separator 50B are stacked, in this order, within the housing 12. The stack is wound and then the resulting wound electrode body is squashed to a flat shape, to yield a square lithium ion battery 10 that houses the wound electrode body.

Figure 2:
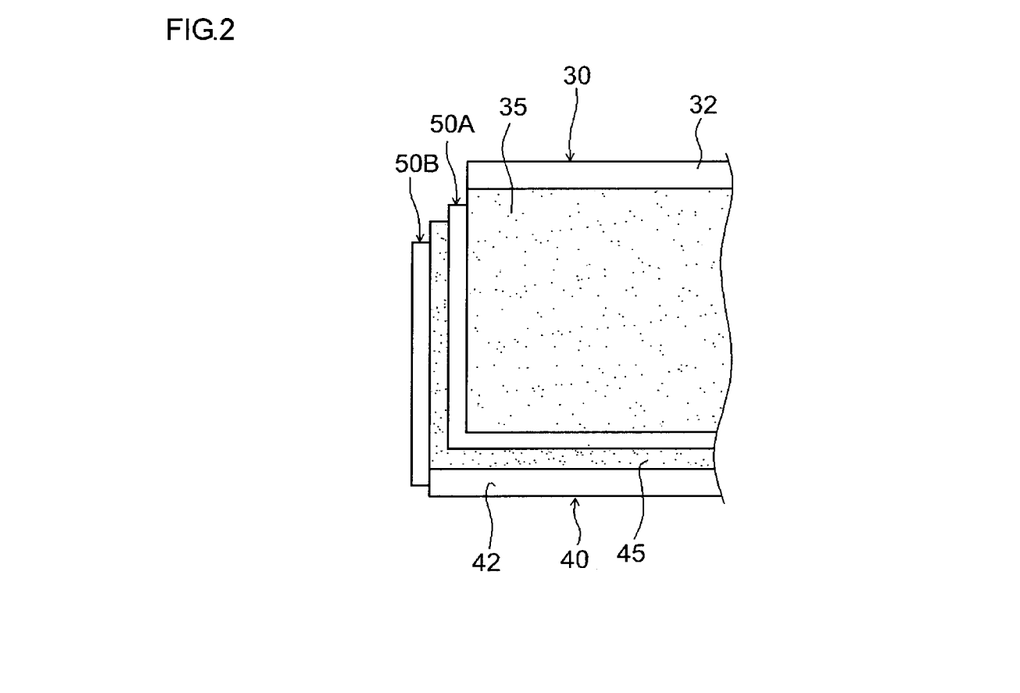
FIG. 2 is a schematic plan-view diagram illustrating positive and negative electrode sheets and separators that make up a wound electrode body of the lithium secondary battery according to the embodiment.

As illustrated in FIG. 2, the positive electrode 30 according to the present embodiment, and which is manufactured in accordance with any of the methods disclosed herein, comprises an elongate sheet-like positive electrode collector 32 (typically, aluminum foil), such that a positive electrode active material layer 35 is formed on the surface of the collector 32. Although not shown in the figure, a barrier layer according to the present invention is formed between the positive electrode active material layer 35 and the collector 32. Preferably, the barrier layer is formed so as to substantially overlap the entire positive electrode active material layer 35, but may also be formed, for instance, over a wider area than that of the positive electrode active material layer 35 (in such a way so as encompass the entire area at which the positive electrode active material layer 35 is formed).

The negative electrode 40 comprises an elongate sheet-like negative electrode collector 42. A sheet material (typically, a metal foil such as copper foil or the like) comprising a metal such as copper can be preferably used as the negative electrode collector 42. A negative electrode active material layer 45 identical to those in conventional lithium secondary batteries is formed on the surface of the collector 42. As the negative electrode active material there can be appropriately used a carbon material (for instance, natural graphite) comprising, at least partially, a graphite structure (lamellar structure). Both faces of the negative electrode collector 42 are coated with a composition for forming a negative electrode active material layer that is prepared by mixing a negative electrode active material such as the above, with a binder (which may be, for instance, a binder identical to that of the polymer material in the active material layer of the positive electrode) and, as needed, a conductive material (which may be, for instance, a conductive material identical to that of active material layer in the positive electrode). Next, the above-described coating material is dried, to form thereby a negative electrode active material layer 45 at desired sites of the collector 42 (FIG. 2).

A porous film comprising a polyolefin resin, for instance polyethylene or polypropylene, may be appropriately used as the separators 50A, 50B that are used superposed on the sheet-like positive and negative electrodes 30, 40.

As illustrated in FIG. 2, portions where the active material layers 35, 45 are absent (active material layer-free portions) are formed along one longitudinal edge of the positive electrode 30 and the negative electrode 40, respectively. The positive and negative electrodes 30, 40 are stacked slightly offset from each other in such a manner that the active material layer-free portion of the positive electrode and the active material layer-free portion of the negative electrode are each respectively disposed along one edge and along the other edge, at the same time that the two active material layer 35, 45 are being superposed, upon stacking of the positive and negative electrodes 30, 40 together with the two separators 50A, 50B. The total four sheets 30, 40, 50A, 50B are wound in the above state, and the resulting wound body is then squashed flat from the side-face direction, to yield a flat wound electrode body.

The obtained wound electrode body is placed in the housing 12, and then part of the active material layer-free portions of the positive electrode and the negative electrode are electrically connected, respectively, to a positive electrode terminal 14 for external connection and to a negative electrode terminal 16 for external connection that are disposed outside the housing 12. Then, an appropriate electrolyte solution for lithium ion batteries is provided (poured into) the housing 12, and the opening of the housing 12 is sealed, for instance by welding of the housing to a lid member 13 corresponding to the housing, to complete thereby the construction (assembly) of the lithium ion battery 10. The process for sealing the housing 12 and providing (pouring) the electrolyte solution are not characterizing features of the present invention, and may be identical to methods employed in the manufacture of conventional lithium ion batteries.

As the electrolyte solution for lithium ion batteries there can be preferably used a non-aqueous electrolyte solution comprising a non-aqueous solvent, and a lithium salt (supporting salt) that is added to, and dissolves in, the solvent.

Examples of the non-aqueous solvent that can be used include, for instance, aprotic solvents such as carbonates, esters, ethers, nitriles, sulfones, lactones or the like. There can be used one, two or more types of solvent selected from among known non-aqueous solvents that can be used in electrolyte solutions or the like of, for instance ordinary non-aqueous batteries (lithium ion batteries), such as propylene carbonate (PC), ethylene carbonate (EC), diethyl carbonate (DEC), dimethyl carbonate, ethyl methyl carbonate (EMC), 1,2-dimethoxyethane, 1,2-diethoxyethane, tetrahydrofuran, 2-methyl tetrahydrofuran, dioxane, 1,3-dioxolane, diethylene glycol dimethyl ether, ethylene glycol dimethyl ether, acetonitrile, propionitrile, nitromethane, N,N-dimethylformamide, dimethyl sulfoxide, sulfolane, γ-butyrolactone or the like.

As the supporting salt contained in the electrolyte solution there can be used one, two or more types of lithium compounds (lithium salts) selected from among $LiPF_6$, $LiBF_4$, $LiClO_4$, $LiAsF_6$, $LiCF_3SO_3$, $LiC_4F_9SO_3$, $LiN(CF_3SO_2)_2$, $LiC(CF_3SO_2)_3$, LiI and the like. The concentration of the supporting salt in the electrolyte solution is not particularly limited, and may be the same as in electrolyte solutions used in conventional lithium ion batteries. There can be used an electrolyte solution containing an appropriate lithium compound (supporting salt) at a concentration of about 0.1 to 5 mol/L.

Examples relating the present invention are explained below, but the present invention is not meant in any way to be limited to the features described in these specific examples.

EXAMPLE 1

Manufacture of a Lithium Ion Battery (1)

An 18650-type lithium ion battery, which is a tubular standard type, was manufactured as described below.

A paste for forming a barrier layer according to the present Example 1 was prepared by mixing acetylene black, as a conductive material and PVDF, as a binder, with an organic solvent (NMP). The approximate mass ratios of the various materials (except NMP) comprised in the paste-like composition were acetylene black 40 mass % and PVDF 60 mass %.

Lithium nickel oxide ($LiNiO_2$) powder as a positive electrode active material, acetylene black as a conductive material and CMC as a binder were mixed with deionized water, to prepare an aqueous paste for forming a positive electrode active material layer according to the present example. The approximate mass ratios of the various materials (except water) comprised in the paste-like composition were lithium nickel oxide 87 mass %, acetylene black 10 mass %, and CMC 3 mass %.

The paste for forming a barrier layer was coated (affixed) onto both faces of an elongated aluminum foil having a thickness of about 15 μm, as a positive electrode collector. The temperature was raised next to 150° C., and was held there for about 180 minutes, to thermally treat (dry) the paste coating material. As a result of the treatment there was formed a barrier layer about 2 μm thick on each face of the positive electrode collector comprising the aluminum foil.

Next, the aqueous paste for forming an active material layer was coated (affixed) onto the barrier layers on both faces of the aluminum foil collector. The temperature was raised next to 150° C., and was held there for about 2 minutes, to dry the paste coating material. As a result of the above treatment there was formed a positive electrode active material layer on the barrier layers of the aluminum foil collector surface. Next, the positive electrode collector was roll-pressed, to produce a positive electrode sheet according to the present example. The thickness of the positive electrode active material layer, on each side, was 65 μm after roll pressing.

Meanwhile, a composition for forming a negative electrode active material layer was prepared by using graphite powder as a carbon material for negative electrode active materials, and CMC and a styrene-butadiene bock copolymer (SBR) as binders. Specifically, the negative electrode active material and the binder were mixed with deionized water, to prepare a paste-like composition for forming a negative electrode active material layer. The approximate mass ratios of the various materials (except water) comprised in the composition were carbon material 95 mass %, CMC 2.5 mass % and SBR 2.5 mass %.

The prepared paste-like composition for forming a negative electrode active material layer was coated (affixed) onto both faces of an elongated copper foil having a thickness of about 10 μm, as a negative electrode collector, followed by drying. As a result of the above treatment there was formed a negative electrode active material layer on the barrier layers of the copper foil collector surface. Next, the negative electrode collector was roll-pressed, to produce a negative electrode sheet according to the present example. The thickness of the negative electrode active material layer, on each side, was 60 μm after roll pressing.

The positive electrode sheet and negative electrode sheet thus produced were stacked, together with two separators (porous polyethylene sheets were used herein), and the resulting sheet stack was wound to produce a wound-type electrode structure. The electrode structure was placed in a container together with an electrolyte solution, to produce a tubular lithium ion battery having a diameter of 18 mm and a height of 650 mm (i.e. an 18650 type). The electrolyte solution is not particularly limited, and electrolyte solutions used in conventional lithium ion batteries may be employed. Herein there was used a non-aqueous electrolyte solution having a composition wherein $LiPF_6$ was dissolved to 1 mol/L in a mixed solvent of 3:7 (volume ratio) of ethylene carbonate (EC) and diethyl carbonate (DEC).

EXAMPLE 2

Manufacture of a Lithium Ion Battery (2)

In the present example there was prepared a paste for forming a barrier layer by mixing acetylene black as a conductive material and PVDF, as a binder, with an organic solvent (NMP). The approximate mass ratios of the various materials (except NMP) comprised in the paste-like composition were acetylene black 30 mass % and PVDF 70 mass %.

A barrier layer was formed in accordance with the same process as in Example 1, but using herein the paste for forming a barrier layer prepared above. Thereafter, there was produced a positive electrode sheet according to the present example in which a positive electrode active material layer was stacked on the barrier layers of both faces of the aluminum foil collector, in accordance with the same process as in Example 1, using the aqueous paste for forming a positive electrode active material layer employed in Example 1. A tubular lithium ion battery having the same shape as in Example 1 was produced next using the same materials and in accordance with the same process as in Example 1, but employing the above positive electrode sheet.

EXAMPLE 3

Manufacture of a Lithium Ion Battery (3)

In the present example there was prepared a paste for forming a barrier layer by mixing acetylene black as a conductive material and PVDF, as a binder, with an organic solvent (NMP). The approximate mass ratios of the various materials (except NMP) comprised in the paste-like composition were acetylene black 20 mass % and PVDF 80 mass %.

A barrier layer was formed in accordance with the same process as in Example 1, but using herein the paste for forming a barrier layer prepared above. Thereafter, there was produced a positive electrode sheet according to the present example in which a positive electrode active material layer was stacked on the barrier layers of both faces of the aluminum foil collector, in accordance with the same process as in Example 1, using the aqueous paste for forming a positive electrode active material layer employed in Example 1. A tubular lithium ion battery having the same shape as in Example 1 was produced next using the same materials and in accordance with the same process as in Example 1, but employing the above positive electrode sheet.

EXAMPLE 4

Manufacture of a Lithium Ion Battery (4)

In the present example there was used the paste for forming a barrier layer produced in Example 2. A barrier layer was formed on both faces of the collector in accordance with the same process of Example 1, but herein the temperature of the thermal treatment (drying) of the paste coating material was set to 140° C.

Thereafter, there was produced a positive electrode sheet according to the present example in which a positive electrode active material layer was stacked on the barrier layers of both faces of the aluminum foil collector, in accordance with the same process as in Example 1, using the aqueous paste for forming a positive electrode active material layer employed in Example 1. A tubular lithium ion battery having the same shape as in Example 1 was produced next using the same materials and in accordance with the same process as in Example 1, but employing the above positive electrode sheet.

EXAMPLE 5

Manufacture of a Lithium Ion Battery (5)

In the present example there was used the paste for forming a barrier layer produced in Example 2. A barrier layer was formed on both faces of the collector in accordance with the same process as in Example 1.

Thereafter, there was produced a positive electrode sheet according to the present example in which a positive electrode active material layer was stacked on the barrier layers of both faces of the aluminum foil collector, in accordance with the same process as in Example 1, using the aqueous paste for forming a positive electrode active material layer employed in Example 1, and with the drying temperature of the paste coating material set to 140° C. A tubular lithium ion battery having the same shape as in Example 1 was produced next using the same materials and in accordance with the same process as in Example 1, but employing the above positive electrode sheet.

COMPARATIVE EXAMPLE 1

Manufacture of a Lithium Ion Battery (6)

A positive electrode sheet according to the present comparative example, in which a positive electrode active material layer was formed on both faces of the aluminum foil collector, was produced in accordance with the same process as in Example 1, using the aqueous paste for forming a positive electrode active material layer employed in Example 1, but without forming any barrier layer on the collector surface. A tubular lithium ion battery having the same shape as in Example 1 was produced next using the same materials and in accordance with the same process as in Example 1, but employing the above positive electrode sheet.

COMPARATIVE EXAMPLE 2

Manufacture of a Lithium Ion Battery (7)

In the present comparative example there was prepared a paste for forming a barrier layer by mixing acetylene black as a conductive material and PVDF, as a binder, with an organic solvent (NMP). The approximate mass ratios of the various materials (except NMP) comprised in the paste-like composition were acetylene black 50 mass % and PVDF 50 mass %.

A barrier layer was formed in accordance with the same process as in Example 1, but using in the present comparative example the paste for forming a barrier layer prepared above. Thereafter, a positive electrode sheet according to the present comparative example, in which a positive electrode active material layer was formed on both faces of the aluminum foil collector, was produced in accordance with the same process as in Example 1, using the aqueous paste for forming a positive electrode active material layer employed in Example 1. A tubular lithium ion battery having the same shape as in Example 1 was produced next using the same materials and in accordance with the same process as in Example 1, but employing the above positive electrode sheet.

COMPARATIVE EXAMPLE 3

Manufacture of a Lithium Ion Battery (8)

In the present comparative example there was prepared a paste for forming a barrier layer by mixing acetylene black as a conductive material and PVDF, as a binder, with an organic solvent (NMP). The approximate mass ratios of the various materials (except NMP) comprised in the paste-like composition were acetylene black 10 mass % and PVDF 90 mass %.

A barrier layer was formed in accordance with the same process as in Example 1, but using in the present comparative example the paste for forming a barrier layer prepared above. Thereafter, a positive electrode sheet according to the present comparative example, in which a positive electrode active material layer was formed on both faces of the aluminum foil collector, was produced in accordance with the same process as in Example 1, using the aqueous paste for forming a positive electrode active material layer employed in Example 1. A tubular lithium ion battery having the same shape as in Example 1 was produced next using the same materials and in accordance with the same process as in Example 1, but employing the above positive electrode sheet.

COMPARATIVE EXAMPLE 4

Manufacture of a Lithium Ion Battery (9)

In the present comparative example there was used the paste for forming a barrier layer produced in Example 2. A barrier layer was formed on both faces of the collector, in accordance with the same process as in Example 1, but herein the thermal treatment (drying) temperature of the paste coating material was set to 130° C.

Thereafter, a positive electrode sheet according to the present comparative example, in which a positive electrode active material layer was formed on both faces of the aluminum foil collector, was produced in accordance with the same process as in Example 1, using the aqueous paste for forming a positive electrode active material layer employed in Example 1. A tubular lithium ion battery having the same shape as in Example 1 was produced next using the same materials and in accordance with the same process as in Example 1, but employing the above positive electrode sheet.

COMPARATIVE EXAMPLE 5

Manufacture of a Lithium Ion Battery (10)

In the present comparative example there was used the paste for forming a barrier layer produced in Example 2. A barrier layer was formed on both faces of the collector, in accordance with the same process as in Example 1, but herein the thermal treatment (drying) temperature of the paste coating material was set to 160° C.

Thereafter, a positive electrode sheet according to the present comparative example, in which a positive electrode active material layer was formed on both faces of the aluminum foil collector, was produced in accordance with the same process as in Example 1, using the aqueous paste for forming a positive electrode active material layer employed in Example 1. A tubular lithium ion battery having the same shape as in Example 1 was produced next using the same materials and in accordance with the same process as in Example 1, but employing the above positive electrode sheet.

COMPARATIVE EXAMPLE 6

Manufacture of a Lithium Ion Battery (11)

In the present comparative example there was used the paste for forming a barrier layer produced in Example 2. A barrier layer was formed on both faces of the collector, in accordance with the same process as in Example 1.

Thereafter, there was produced a positive electrode sheet according to the present comparative example, in which a positive electrode active material layer was stacked on the barrier layers of both faces of the aluminum foil collector, in accordance with the same process as in Example 1, using the aqueous paste for forming a positive electrode active material layer employed in Example 1, and with the drying temperature of the paste coating material set to 160° C. A tubular lithium ion battery having the same shape as in Example 1 was produced next using the same materials and in accordance with the same process as in Example 1, but employing the above positive electrode sheet.

TEXT EXAMPLE

Evaluation of Initial Internal Resistance and Durability

The initial internal resistance value (hereafter, "initial resistance value") of the lithium ion batteries obtained in the examples and comparative examples was measured in accordance with the resistance measurement method described below. The internal resistance value (hereafter, "late resistance value") of the secondary batteries after repeated charging and discharging was measured in accordance with the same test method, after a charge-discharge cycle test under the conditions below.

Measurement of the Initial Resistance Value

The batteries were charged at a constant current of 1000 mA/cm$^2$ up to 3.75 V, at an environment temperature of 25° C. Thereafter, the batteries were charged at a constant voltage of 3.75 V, and charging continued until the final current value upon constant voltage charging reached 1/10 of the initial current value. The state of charge (SOC) at this time was about 60% of full charge. Thereafter, the batteries were charged and discharged in the order (a) to (f) below. The initial resistance value was worked out form the slope of a linear-approximation straight line of the values in a current (I)-voltage (V) plot where voltage after each charge-discharge was plotted in the vertical axis and the charge-discharge current in the horizontal axis.

(a) Discharge at 300 mA/cm$^2$ for 10 seconds.
(b) Charge at 300 mA/cm$^2$ for 10 seconds.
(c) Discharge at 900 mA/cm$^2$ for 10 seconds.
(d) Charge at 900 mA/cm$^2$ for 10 seconds.
(e) Discharge at 2700 mA/cm$^2$ for 10 seconds.
(f) Charge at 2700 mA/cm$^2$ for 10 seconds.

Charge-Discharge Cycle Test for Late Resistance Value

The batteries were charged at constant current, under a current density of 2C, up to 4.1 V, under an environment temperature of 60° C. The batteries were then discharged at the same current density, down to 3.0 V. This charge-discharge cycle (wherein one cycle involved charging up to 4.1 V and discharging down to 3.0 V at a constant current of 2C) was repeated 500 times. The reference numeral "C" denotes the discharge hour rate. Therefore, a current density 2C denotes a current density (A) such that the electric charge corresponding to the battery capacity (Ah) of the battery can be supplied in 0.5 hours. As in the case of the initial resistance value, the resistance value after 500 cycles of charge-discharge (late resistance value) was worked out from a linear-approximation straight line of I-V plot values after charge and discharge.

There was assessed the relationship between the initial resistance value and the content of water-insoluble polymer (i.e. binder) in the composition for forming a barrier layer. The results are given in Table 1.

TABLE 1

| | Binder content (%) | Initial resistance value (mΩ) |
|---|---|---|
| Example 1 | 60 | 37 |
| Example 2 | 70 | 35 |
| Example 3 | 80 | 34 |
| Comp. Example 1 | — | 52 |
| Comp. Example 2 | 50 | 40 |
| Comp. Example 3 | 90 | 43 |

As the results in Table 1 show, the content proportion of water-insoluble polymer (binder, herein PVDF) comprised in the composition used for forming a positive electrode barrier layer in the lithium ion battery that employs the positive electrode according to the present invention is relatively higher than the content proportion of the conductive material comprised in the composition for forming a barrier layer. Also, and the content of water-insoluble polymer ranges from 55 to 85 mass % with respect to 100 mass % of the total amount of conductive material plus water-insoluble polymer. As a result, there is achieved a lowering of the initial resistance value (herein, lower than 40 mΩ) vis-à-vis the batteries of Comparative Example 2 and Comparative Example 3.

Next there was assessed a relationship between initial resistance values and late resistance values, and the thermal treatment temperature during heating of the collector after application of the composition for forming a barrier layer (i.e. the paste for forming a barrier layer) onto the positive electrode collector surface. The results are given in Table 2.

TABLE 2

| | Thermal treatment temperature (° C.) | Initial resistance value (mΩ) | Late resistance value (mΩ) |
|---|---|---|---|
| Example 2 | 150 | 35 | 36 |
| Example 4 | 140 | 32 | 34 |
| Comp. Example 4 | 130 | 30 | 40 |
| Comp. Example 5 | 160 | 40 | 42 |

The results in Table 2 show that low initial internal resistance (herein, lower than 40 mΩ) as well as good charge-discharge cycle characteristics (herein, late resistance value lower than 40 mΩ) can be realized in a lithium ion battery that uses a positive electrode produced by heating the collector up to 140 to 150° C., after application of the composition for forming a barrier layer according to the present invention onto the positive electrode collector surface.

Next there was assessed the relationship between the initial resistance value and late resistance value and the drying temperature of the composition for forming an active material layer, after stacking of the composition for forming an active material layer (i.e. aqueous paste for forming a positive electrode active material layer) onto the barrier layer surface. The results are given in Table 3.

TABLE 3

| | Thermal treatment temperature (° C.) | Initial resistance value (mΩ) | Late resistance value (mΩ) |
| --- | --- | --- | --- |
| Example 2 | 150 | 35 | 36 |
| Example 5 | 140 | 34 | 36 |
| Comp. Example 6 | 160 | 42 | 45 |

The results in Table 3 show that low initial internal resistance (herein, lower than 40 mΩ) as well as good charge-discharge cycle characteristics (herein, late resistance value lower than 40 mΩ) can be realized by applying the composition for forming a barrier layer according to the present invention onto the positive electrode collector surface, and further applying the composition for forming an active material layer (i.e. aqueous paste for forming a positive electrode active material layer) onto the barrier layer, followed by drying at a temperature not higher than 150° C. (herein, 140 to 150° C.).

Therefore, the manufacturing method according to the present invention allows manufacturing a high-quality, high-performance lithium secondary battery.

Specific examples of the present invention have been explained in detail above, but these are merely illustrative in nature and do not limit the claims of the present invention in any way. The features set forth in the claims encompass various modifications and changes to the specific examples illustrated above. For instance, the invention is not limited to wound-type batteries, and can be used also in lithium secondary battery of various forms. So long as the object of the present invention is not compromised thereby, other constituent elements (auxiliary components) can be included in the barrier layer and/or positive electrode active material layer, in addition to the essential constituent elements described above. For instance, the barrier layer may contain a positive electrode active material.

Industrial Applicability

Figure 3:
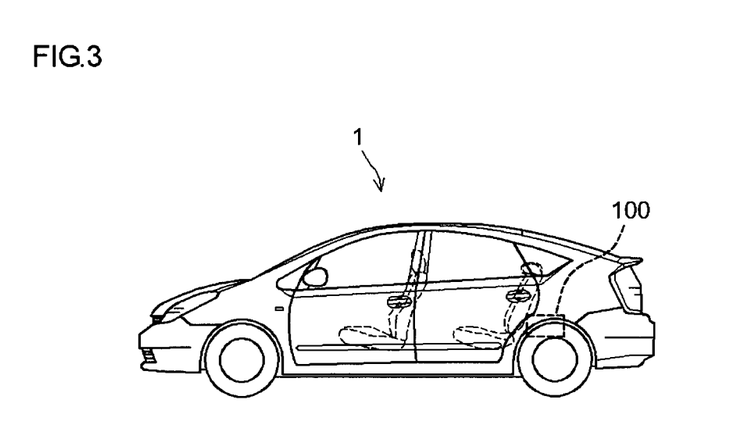
FIG. 3 is a side-view diagram illustrating schematically a vehicle (automobile) provided with a lithium secondary battery.

The present invention allows providing a positive electrode for lithium secondary batteries wherein a positive electrode collector surface has formed thereon a barrier layer (conductive layer) that realizes both high water resistance and high conductivity. A lithium secondary battery provided with such a positive electrode exhibits good battery characteristics (for instance, battery capacity and charge-discharge cycle characteristics), and can hence be used in various applications. For instance, the battery can be used as a battery pack 100 employed as a power source in the motor of a vehicle 1 (typically, an automobile provided with an electric motor, in particular a hybrid automobile, an electric automobile or a fuel-cell automobile), as illustrated in FIG. 3.

The invention claimed is:

1. A lithium secondary battery comprising a positive electrode for lithium secondary batteries, being a positive electrode used in lithium secondary batteries, comprising:
    a positive electrode collector;
    a barrier layer on the positive electrode collector, and comprising a composition having a conductive material, and at least one type of water-insoluble polymer that is soluble in organic solvents but insoluble in water, as a first binder wherein a content of the water-insoluble polymer in the barrier layer is 55 to 85 mass % with respect to 100 mass % of a total amount of the conductive material plus the water-insoluble polymer, and wherein the barrier layer is formed by heating the collector having the composition thereon up to 140 to 150° C.; and
    a positive electrode active material layer, being stacked on the barrier layer, and having a positive electrode active material, and at least one type of aqueous polymer that is insoluble in organic solvents but soluble or dispersible In water, as a second binder;
    a thickness of the barrier layer is 1 μm to 2 μm,
    a thickness of the positive electrode active material layer is 30 μm to 80 μm, and
    both an initial internal resistance value and an internal resistance after 500 cycles of charge-discharge under an environment temperature of 60° C. are lower than 40 mΩ.

2. The lithium secondary battery according to claim 1, wherein the positive electrode active material is a lithium-transition metal complex oxide.

3. The lithium secondary battery according to claim 1, wherein a thickness of the positive electrode active material layer is 15 to 80 times greater than the thickness of the barrier layer.

4. A method for manufacturing a lithium secondary battery having both an initial internal resistance value and an internal resistance after 500 cycles of charge-discharge under an environment temperature of 60° C. being lower than 40 mΩ, comprising the steps of:
    preparing a composition for forming a barrier layer, having a conductive material, an organic solvent and at least one type of water-insoluble polymer that is soluble in organic solvents but insoluble in water, as a first binder, a content of the water-insoluble polymer in the composition being set to 55 to 85 mass % with respect to 100 mass % of a total amount of the conductive material plus the water-insoluble polymer;
    applying the prepared composition onto a surface of a positive electrode collector such that the prepared composition has a thickness of 1 μm to 3 μm, and heating thereafter the collector up to 140 to 150° C., to form a barrier layer having a thickness of 1 μm to 2 μm on the positive electrode collector;
    applying a composition for forming an active material layer, comprising a positive electrode active material, an aqueous solvent and at least one type of aqueous polymer that is insoluble in organic solvents but soluble or dispersible in water, as a second binder, onto a surface of the barrier layer, to form a positive electrode active material layer having a thickness of 30 μm to 80 μm on the barrier layer; and
    assembling a lithium secondary battery using the positive electrode having the barrier layer and the positive active material layer.

5. The manufacturing method according to claim 4, wherein a lithium-transition metal complex oxide is used as the positive electrode active material.

6. The manufacturing method according to claim 4, wherein after application of the composition for forming an active material layer onto a surface of the barrier layer, the applied composition for forming an active material layer is dried at a temperature not higher than 150° C.

* * * * *